United States Patent [19]
King et al.

[11] 4,030,784
[45] June 21, 1977

[54] GAS BEARING ROLL SHELL ASSEMBLY WITH SELECTIVE DRIVE MEANS

[75] Inventors: Donald J. King, Huron; Loren E. Lura, Sandusky; Ewalt Maurushat, Huron, all of Ohio

[73] Assignee: General Motors Corporation, Detroit, Mich.

[22] Filed: June 18, 1976

[21] Appl. No.: 697,350

[52] U.S. Cl. .............................. 308/107; 308/122
[51] Int. Cl.² ...................................... F16C 17/16
[58] Field of Search ..................... 308/9, 107, 122

[56] References Cited
UNITED STATES PATENTS

| | | | |
|---|---|---|---|
| 3,374,039 | 3/1968 | Voorhies | 308/107 |
| 3,527,510 | 9/1970 | Christiansen | 308/107 |
| 3,645,590 | 2/1972 | Bird et al. | 308/9 |

Primary Examiner—Joseph F. Peters, Jr.
Assistant Examiner—Gene A. Church
Attorney, Agent, or Firm—F. J. Fodale

[57] ABSTRACT

A gas bearing roll shell assembly comprises an outer rotatable roll shell carried on an externally pressurized gas bearing between the roll shell and a stationary axle. The roll shell has end rings, one of which has turbine buckets recessed into its bore. The axle carries a valve body having part-chordal passages aligned with the turbine buckets and a rotatable valve for selectively driving the roll shell in one direction or the other. In a modified form, selection is limited to driving in a single direction by a pin and slot arrangement. The assembly is especially useful as an overrun roller in textile machinery involving the high speed transport of threads, yarns or the like.

10 Claims, 8 Drawing Figures

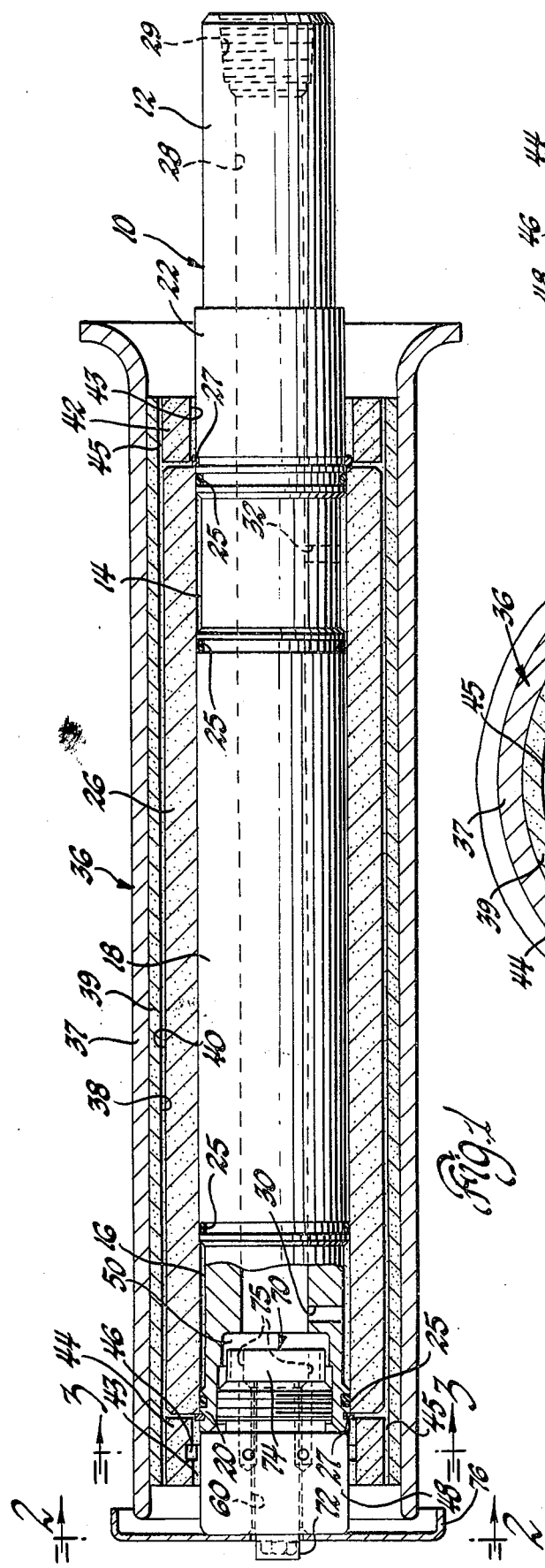
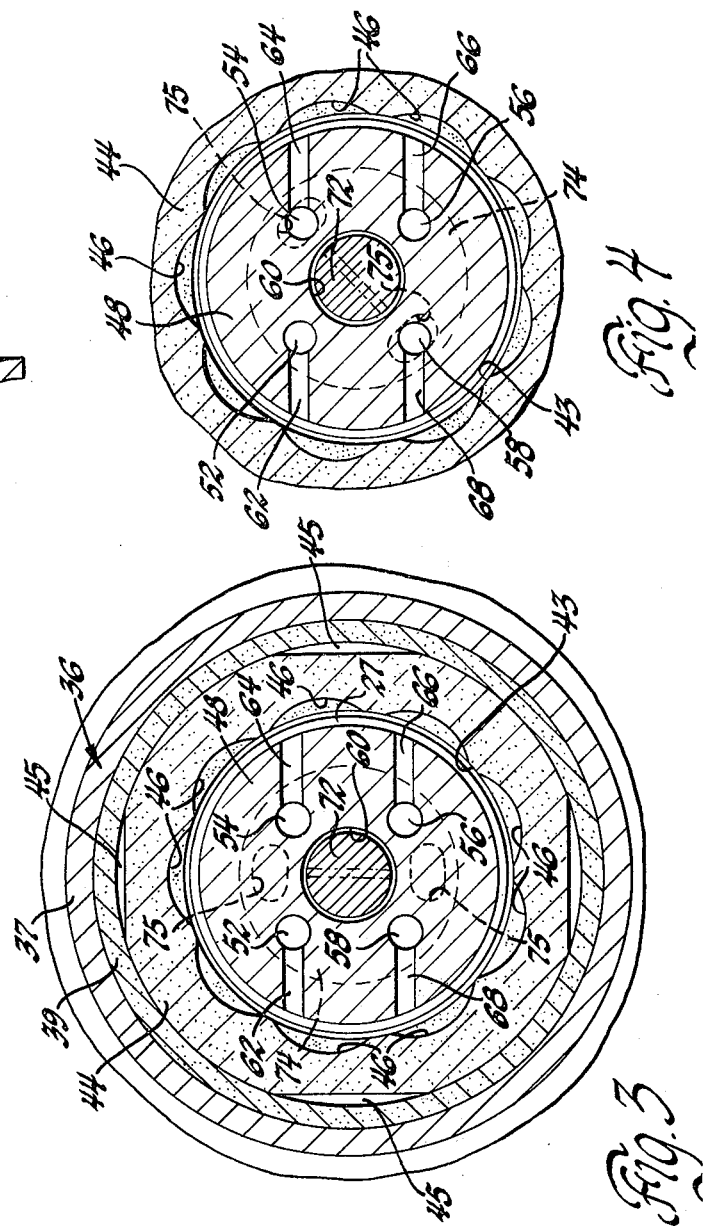
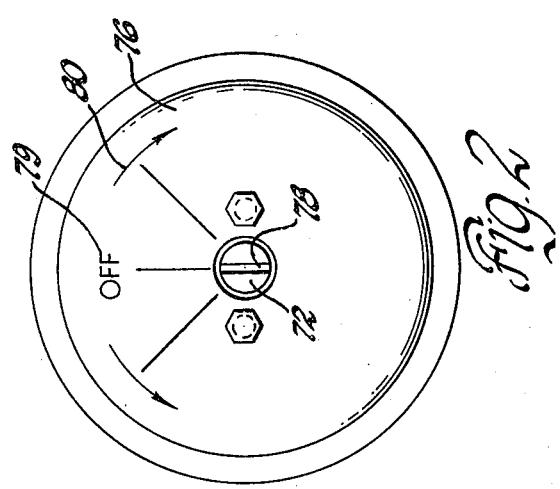

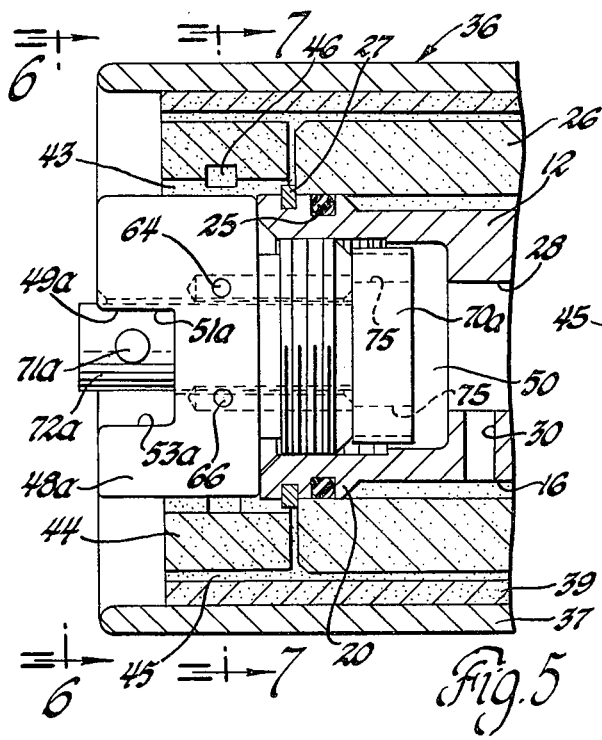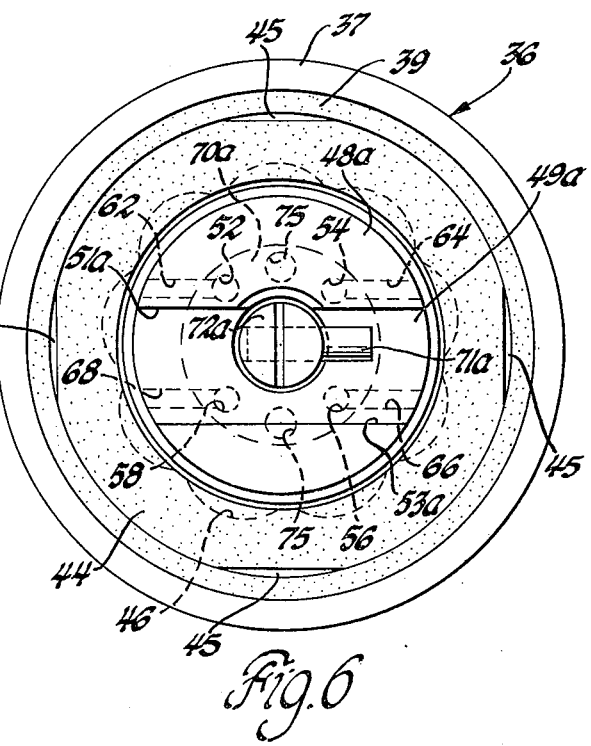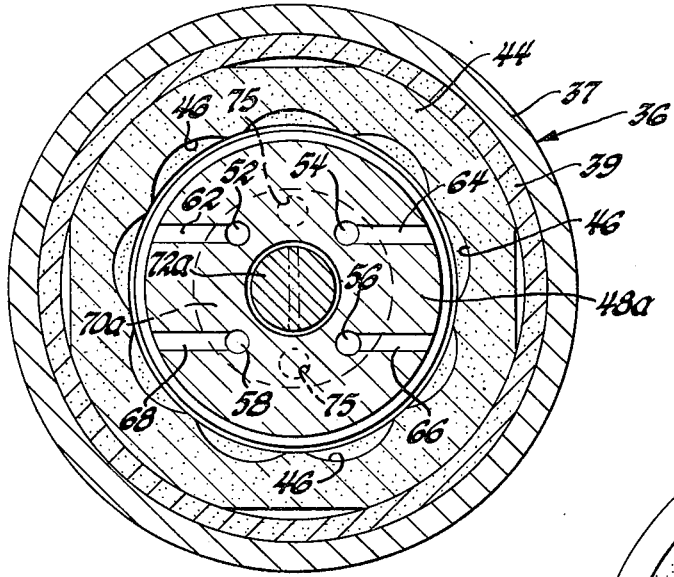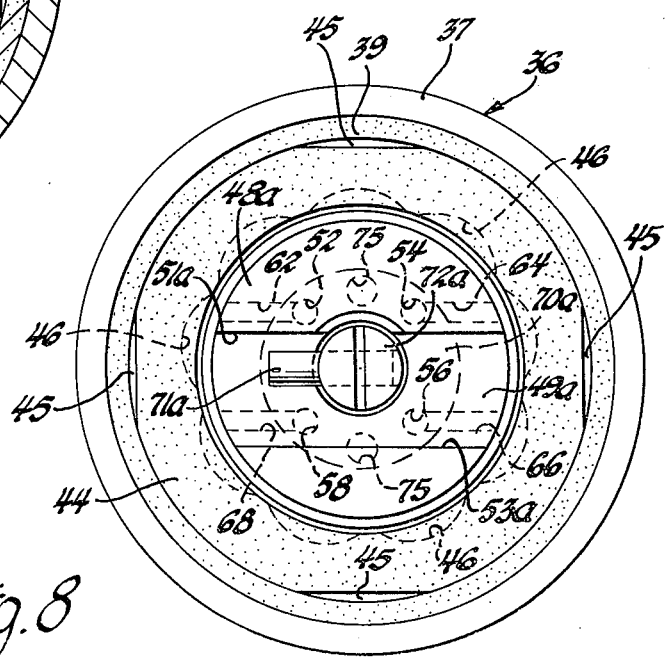

GAS BEARING ROLL SHELL ASSEMBLY WITH SELECTIVE DRIVE MEANS

This invention relates generally to a gas supported or gas bearing roll shell assembly in which a roll shell is rotatably carried on an axle which has an axial gas feed channel and, in the bearing zone of the roll shell, also has radial openings through which the compressed gas passes in a bearing gap between the axle and the inner wall of the roll shell which are especially useful as thread overrun rollers.

Thread overrun rollers are generally understood to be those rollers on a textile machine or apparatus which are driven by the running thread itself. Gas bearing roll shell assemblies which are well suited for use in thread treatment devices for synthetic threads, for example, for heated stretching or drawing, heat fixing and the like in which compressed air is supplied through a fixed axle and then passes through a porous sleeve surrounding the axle into the bearing gap, are already known. See for instance, U.S. Pat. No. 3,374,039 issued to Donald A. Voorhies on Mar. 19, 1968 for an "Antifriction Bearing" and U.S. Pat. No. 3,527,510 issued to Paul J. Christianson on Sept. 8, 1970 for an "Antihammer Device for Air Spindles". However, when very high turning rates of the driven roller (for example on the order of 30,000 rpm or more) are brought about by correspondingly high thread speeds, such revolving rollers have certain inadequacies in meeting the requirements of textile machines operating at such high thread running speeds. For example, thread breakage occurs frequently, especially in the initial application of the thread in starting the roller when the undriven thread overrun roller must be accelerated by the running thread.

Gas bearing roll shell assemblies are also known from the U.S. Pat. No. 3,746,233 issued to Kar Bauer et al on July 17, 1973 for an "Air Supported Thread Overrun Roller" which proposes to alleviate the above noted problem by providing means to accelerate the roll shell during initial application of the thread. The disclosed solution of incorporating axial exhaust passages at the outer diameter of the thrust rings which are oblique to the axis of rotation of the roll shell however, results in the roll shell being constantly driven whereas, as pointed out in the Bauer patent, the problem occurs primarily during initial application of the thread. Another limitation of the proposed Bauer solution is that the roll shell is driven in only one direction and consequently a differently fabricated roll shell must be utilized for clockwise drive application than for a counter-clockwise drive application.

Also in some applications it is not only desirable to discontinue to drive after initial application of the thread but it is also desirable to brake the roll during operation to increase tension on the thread or during the final stages of winding a thread package.

It is the object of this invention in its broadest aspect to generally improve upon known gas bearing roll shell assemblies, as exemplified above by providing means for selectively driving the roll shell.

Another object of this invention is to provide a gas bearing roll shell assembly which incorporates an extremely versatile arrangement for selectively driving the roll shell.

A feature of the invention is that forward, neutral or reverse drive may be selected.

Another feature of the invention is that selection may be limited to a choice neutral and drive in one direction or the other by a simple adjustable modification.

Yet another feature of the invention is that drive speeds may be varied.

Yet another feature of the invention is the provision for an audible signal when a drive mode is utilized.

Yet another feature of the invention is the utilization of a simple self-sealing manually operative valve for selecting the drive mode.

Other objects and features of the invention will become apparent to those skilled in the art as the disclosure is made in the following detailed description of preferred embodiments of the invention as illustrated in the accompanying sheets of drawings in which:

FIG. 1 is a longitudinal view, partially in cross section of a gas bearing roll shell assembly with selective drive means in accordance with this invention;

FIG. 2 is an end view of the roll shell assembly taken substantially along the line 2—2 of FIG. 1 and looking in the direction of the arrows;

FIG. 3 is a cross section taken substantially along the line 3—3 of FIG. 1 and looking in the direction of the arrows;

FIG. 4 is a fragmentary view similar to FIG. 3 but showing the valve in a different operative position;

FIG. 5 is a fragmentary view similar to FIG. 1 showing a modified form of a gas bearing roll shell assembly in accordance with this invention.

FIG. 6 is an end view of the roll shell assembly taken substantially along the line 6—6 of FIG. 5 and looking in the direction of the arrows, FIG. 7 is a cross section taken substantially along the line 7—7 of FIG. 5 and looking in the direction of the arrows; and FIG. 8 is a view similar to FIG. 6 showing a valve stop adjusted for a different mod of operation.

Generally considered, my invention is illustrated in the form of a gas bearing roll shell assembly wherein a roll shell is selectively driven and radially supported and axially positioned for nearly friction-free rotation by a flowing gas which is uniformly distributed under pressure against a cylindrical wall of the roll shell through the evenly distributed interconnected pore structure of a porous supporting sleeve mounted on an axle.

As illustrated in FIGS. 1, 2, 3 and 4, there is provided an axle or hub 10 having an end portion, herein shown as a reduced portion 12, arranged to be held within a suitable support (not shown). The axle 10 is cylindrical and has a pair of axially spaced annularly extending external recesses or grooves 14 and 16 respectively located at opposite sides of an intermediate cylindrical portion 18 which has the same diameter as cylindrical portion 20 at the left end of the axle 10 and cylindrical portion 22 adjacent the end 12. A porous sleeve 26 is nonrotatably fitted on the axle 10 in sealing engagement with the cylindrical portions 18, 20 and 22 thus making the porous sleeve 26 an enlarged diameter portion of the axle 10 and the recesses 14 and 16 annular chambers between the axle 10 and the sleeve 26. The right end of the sleeve 26 terminates intermediate the length of the cylindrical portion 22 and the left end of the sleeve 26 similarly terminates intermediate the length of the cylindrical portion 20.

The porous sleeve 26 may be made from a sintered material having a substantially uniform intercommunicating pore structure throughout its entire body — this intercommunicating pore structure being of a size to uniformly disperse the flow of fluid under pressure therethrough. These intercommunicating pores are preferably very small and uniform in size and open through the outer walls of the sleeve in very closely spaced relation to each other. Suitable sleeves for this purpose have been constructed from sintered iron, bronze, ceramic materials, carbon, carbongraphite mixtures, and from various plastics and other materials which are molded with a predetermined interconnected small pore structure.

As shown in the drawing the cylindrical portions 18, 20 and 22 have narrow circumferential grooves in which four elastomeric O-rings 25 are disposed. These O-rings provide excellent seals for the chambers formed from the recesses 14 and 16, remove the requirements for a heavy press fit between the sleeve 26 and the axle 10 and provide a limited resilient movement of the sleeve 26 in the radial direction to enhance the radial stability of the roll shell during operation. The cylindrical portions 20 and 22 may also have second narrow circumferential grooves carrying snap rings 27 to axially locate the sleeve 26 with respect to the axle 10.

An axial bore 28 extends into the axle 10 from an inlet 29 at the right end of axle 10 and communicates through generally radial passages 30 and 32 with the chambers 14 and 16 between the sleeve 26 and the axle 10. With this arrangement, fluid under pressure is distributed uniformly against the interior of the porous sleeve 26. An impervious rotatable roll shell 36 which may comprise an outer metal shell 37 and a non-metallic liner 39 of bearing material retained therein by shrink fit has a cylindrical bore 38 which is in close surrounding relation about the cylindrical external surface 40 of the porous sleeve 26. The bore 38 and the cylindrical surface 40 are precisely dimensioned and the small radial clearance between their diameters may be as small as a fraction of a thousandth of an inch.

The radial spaces beyond the ends of the sleeve 26 which are between the roll shell 36 and the cylindrical axle portions 20 and 22 are partially closed by annular thrust rings 42 and 44 respectively, press fitted in the cylindrical bore at opposite ends of the liner 39. The bores of the thrust rings 42 and 44 are spaced from the axle 10 with the radial clearance between the bore and the axle portions 20 and 22 normally being greater than the radial distance between the roll shell 36 and the sleeve 26. The annular opening 43 thus provided are exhaust passages for gas to flow out of the roll shell. The thrust rings 42 and 44 also have four equally circumferentially spaced flats in their outer circumferential surface which provide exhaust passages 45 at the bore of the liner 39. The exhaust passages 45 when properly sized prevent an instability phenomenon in the axial direction known as air hammer as more fully explained in U.S. Pat. No. 3,527,510 granted Sept. 8, 1970 referred to hereinabove.

As best illustrated in FIGS. 1, 3 and 4, the bore of the thrust ring 44 has a plurality of circumferentially spaced recesses of reduced width forming turbine buckets 46. The axial walls defining the recesses are part circular in cross section and generated from centers lying on radii of the thrust ring 44. Consequently, the turbine buckets 46 are bi-directional and can be utilized to drive the roll shell 36 in either clockwise or counterclockwise directions.

The left end of the axle 10 is counterbored and threadably receives a valve body 48 forms an enlarged internal chamber 50 at the left end of the bore 28. The valve body 48 has four axial blind-ended inlet bores 52, 54, 56 and 58 which lead from the inboard face of the valve body 48 to respective inlets for the respective part chordal passages 62, 64, 66 and 68. The centerlines of the part chordal passages 62, 64, 66 and 68 lie in a common plane which bisects the turbine buckets 46 in the axial direction. The part chordal passages 62 and 66 have inlets which lead their outlets in the clockwise direction as viewed in FIG. 3. Consequently, gas streams exiting their outlets have a tangential component in the counterclockwise direction and upon impinging the turbine buckets 46 drive the roll shell 36 counterclockwise with respect to the axle 10. The part chordal passages 64 and 68 on the other hand have inlets which lag their outlets in the clockwise direction. Consequently, gas streams exiting their outlets have a tangential component in the clockwise direction and upon impinging on the turbine buckets 46 drive the roll shell 36 in the clockwise direction.

The assembly further includes a valve 70 which has a stem 72 rotatably mounted in the bore 60 of the valve body 48 and an enlarged head 74 disposed in the chamber 50. The head 74 has two kidney shaped holes 75. The left end of the stem 72 protrudes through an annular end plate 76 bolted to the valve body 48. The exterior end face of the stem 72 has a slot 78 which receives an ordinary screw driver for manually selecting the mode of operation of the roll shell assembly and which in cooperation with indicia of the exterior face indicates the mode of operation selected.

In FIGS. 1, 2 and 3, the valve 70 is positioned in the off or neutral drive position and the roll shell assembly operates without drive in either direction.

That is, a gas such as air is directed under pressure into the bore 28 of the axle and out through the passsages 30 and 32 into the annular chambers 14 and 16. The closely spaced small interconnected pore structures which exists throughout the sleeve 26, evenly distributes the gas under reduced pressure into the small annular space between the outer cylindrical surface 40 of the sleeve 26 and the inner cylindrical surface 38 of the roll shell 36 thus supporting the roll shell for nearly friction-free rotation upon a thin annular body or layer of flowing gas. The manner of rotatably supporting the roll shell on a layer of flowing gas and the pressure regulating function of the porous sleeve 26 are well known. Suffice it to say a relatively low gas pressure is sufficient to support the roll shell for nearly friction free rotation even when this roll shell is subjected to an appreciable radial load.

The gas under pressure between the porous sleeve 26 and the roll shell 36 then flows either into the annular pockets at the ends of the sleeve 26 and out the exhaust passages 43 or out the exhaust passages 45.

Immediately upon the gas under pressure being directed into the bore 28. The chamber 50 is pressurized and the valve head 74 is pneumatically biased into self-sealing engagement with the valve body 48 maintained in the selected position. As best illustrated in FIG. 3, the kidney shaped holes 75 are not aligned with any of the inlet bores of the valve body 46 and the inlet bores are blocked off by solid portions of the valve head 74 when the valve 70 is in the neutral drive or off position which is indicated by the slot 78 in conjunction with indicia 79 on the end plate 76.

When clockwise drive indicated by the arrow 80 is desired, the valve 70 is manually rotated 45° in the clockwise direction where the slot 78 aligns with the lead line for the arrow 80. This shifts the kidney shaped holes 75 into alignment with the inlet bores 54 and 58 as indicated in FIG. 4. Consequently, during operation, gas under pressure in the bore 28 flows into the part chordal passages 64 via the chamber 70, holes 75 and the inlet bores 54 and 58. This gas exits in a high energy stream which impinges on the turbine buckets 46 and drives the roll shell 36 in the clockwise direction.

In a similar manner, manual rotation of the valve 70, 45° in counterclockwise direction from the neutral drive position aligns the holes 75 with the inlet bores 52 and 56 producing a high energy gas stream exiting from the part chordal passages 62 and 66 which drives the roll shell 36 in the counterclockwise direction.

In the clockwise and counterclockwise drive modes, impingement of the gas stream on the turbine buckets 46 produces an audible sound indicating to the operator that the roll shell assembly is in a drive mode of operation. The drive speed may also be varied by rotating the valve more or less than 45° and partially blocking the inlet bores with solid portions of the valve head 70 adjacent the holes 75.

FIGS. 5, 6, 7 and 8 illustrate a modified form of the invention in which the selectable modes of operation may be limited to a choice between either neutral and clockwise drive or neutral and counterclockwise drive. The modified form of the invention has many parts identical to those disclosed in FIGS. 1, 2, 3 and 4 and these identical parts are identified with the same numerals.

The modified structure consists of a modified valve body 48a and valve 70a. The valve body 48a is shortened so as to not protrude beyond the roll shell 37 and also has a slot 49a in its exterior face. The valve 70a has a correspondingly shortened stem which carries a pin 71a snugly fitted in a cross bore. The valve body 48a and valve 70a are otherwise the same as the valve body 48 and valve 70 and the corresponding portions are identified with like numerals.

Focussing now on FIG. 6, the pin 71a protrudes from the right side of the stem 72a and is disposed in the slot 49a. The sides 51a and 53a of the slot 49a are on opposite sides of the stem axis and the valve body bore centerline with the side 51a being closer to the axis than the side 53a. The pin 71a constitutes a stop which limits manual rotation of the valve to a few degrees in the counterclockwise direction and to about 45° in the clockwise direction from the position shown in FIG. 6 by engagement with the slot sides 51a and 53a. Thus the valve 70a permits only a selection between neutral drive corresponding to the valve position shown in FIGS. 6 and 7 and clockwise drive corresponding to 45° clockwise rotation of the valve 70 from the position shown in FIG. 6 to a position where the holes 75 align with the inlet bores 54 and 58.

The modified form of the invention also limits selection between neutral and clockwise drive simply by adjusting the pin 71a so that it protrudes from the left side of the stem as shown in FIG. 8. In the adjusted position, the pin 71a permits the valve 70a to be manually rotated 45° in the counterclockwise direction from the neutral drive position to a position where the holes 75 align with the inlet bores 52 and 56 producing counterclockwise drive during operation.

If desired the end plate 76 with or without its indicia may be utilized in the modified form by suitable lengthening of the valve body and stem.

In view of the above it can be seen that this invention provides an extremely versatile arrangement for selectively driving the roll shell.

We wish it to be undersood that we do not desire to be limited to the exact details of construction shown and described, for obvious modifications will occur to a person skilled in the art.

What is claimed is:

1. A gas bearing roll shell assembly for textile machinery and the like having selective drive means comprising:
    an axle having an intermediate enlarged diameter portion and supply passage means having an inlet adjacent an axial end thereof adapted for connection to a source of gas under pressure,
    restrictive passage means through said enlarged diameter portion leading from said supply passage means to an outer circumferential surface thereof,
    a rotatable roll shell surrounding said enlarged diameter portion with a small radial clearance whereby said roll shell is adapted to be radially supported on a layer of gas supplied from said supply passage means via said restrictive passage means,
    a first thrust ring fixed on said roll shell adjacent an axial end thereof and surrounding said axle between said intermediate portion and said axial end of said axle, a second thrust ring fixed on said roll shell adjacent an opposite axial end thereof and surrounding an opposite annular end portion of said axle,
    and means for selectively driving said roll shell during operation comprising a plurality of circumferentially spaced turbine buckets recessed into the bore of said second thrust ring,
    first part chordal passage means in said annular end portion of said axle having first inlet means for receiving gas under pressure from said supply passage means and first outlet means aligned in the axial direction with said turbine buckets,
    a valve rotatably mounted in said annular end portion of said axle for rotary movement between a neutral drive position whereat said inlet means are closed off from said supply passage means and a first drive position whereat said inlet said inlet means are in fluid communication with said supply passage means for receiving gas under pressure therefrom and directing the same onto said turbine buckets to drive said roll shell in a forward direction,
    said valve further having exterior portions for manually rotating said valve between said neutral and said first drive positions during operation.

2. A gas bearing roll shell assembly as defined in claim 1 wherein said annular end portion of the axle has second part chordal passage means therein having second inlet means for receiving gas under pressure from said supply passage means and second outlet means aligned with said turbine buckets in the axial direction, said first and second inlet means respectively leading and lagging imaginary radial lines through their associated outlet means whereby said first and second part chordal passage means are adapted to drive said roll shell in opposite directions, respectively.
    wherein said valve closes off said first and second inlet means when in said neutral drive position, closes off said second inlet means when in said first drive position and is manually rotatable to a second drive position whereat said first inlet means are closed off and said second inlet means are in fluid communication with said supply passage means for receiving gas under pressure and directing the same unto said turbine buckets to drive said roll shell in a reverse direction, and wherein said exterior portions of said valve are for manually rotating said valve between said neutral, forward and reverse drive positions.

3. The bearing roll shell assembly as defined in claim 2 wherein said exterior portions of said valve includes a stop which engages said axle to prevent positioning said valve means in one of said forward and reverse drive positions.

4. The gas bearing roll shell assembly as defined in claim 3 wherein said stop is adjustable to select elimination of either said forward drive position or said reverse drive position.

5. The gas bearing roll shell assembly as defined in claim 2 wherein said annular end portion has indicia which in cooperation with said exterior portions of said valve indicate the drive mode of the roll shell assembly.

6. A gas bearing roll shell assembly for textile machinery and the like having selective drive means comprising:
- an axle having an intermediate enlarged diameter portion and supply passage means having an inlet adjacent an axial end thereof adapted for connection to a source of gas under pressure,
- a valve body secured to an opposite axial end of said axle and forming and internal chamber in said axle in fluid communication with said supply passage means for receiving gas under pressure therefrom,
- restrictive passage means through said enlarged diameter portion leading from said supply passage means to an outer circumferential surface thereof,
- a rotatable roll shell surrounding said enlarged diameter portion with a small radial clearance whereby said roll shell is adapted to be radially supported on a layer of gas supplied from said internal chamber via said restrictive passage means,
- a first thrust ring fixed on said roll shell adjacent an axial end thereof and surrounding said axle between said intermediate portion and said axial end of said axle,
- a second thrust ring fixed on said roll shell adjacent an opposite axial end thereof and surrounding said valve body,
- and means for selectively driving said roll shell during operation comprising a plurality of circumferentially spaced turbine buckets recessed into the bore of said second thrust ring,
- a plurality of part chordal passagers in said valve body having inlets for receiving gas under pressure from said internal chamber and outlets aligned in the axial direction with said turbine buckets.
- a valve having a stem disposed in a bore through said valve body and an enlarged head disposed in said chamber, said valve being rotatably moveable between a neutral drive position whereat said inlets are closed off from said chamber by solid portions of said head and a forward drive position whereat said inlets are in fluid communication with said chamber via holes through said head for receiving gas under pressure and directing the same unto said turbine buckets to drive said roll shell, and
- said valve stem having an exterior portion for manually rotating said valve between said neutral and said forward drive positions during operation.

7. A gear bearing roll shell assembly as defined in claim 6 wherein said turbine buckets are narrower than said second thrust ring and are shaped in cross section for bidirectional operation,
- wherein said valve body has a second plurality of part chordal passages therein having second inlets for receiving gas under pressure from said internal chamber and second outlets aligned with said turbine buckets in the axial direction, said first and second inlets respectively leading and lagging imaginary radial lines through their associated outlets whereby said first and second plurality of part chordal passages are adapted to drive said roll shell in opposite directions, respectively,
- wherein said valve head closes off said first and second inlets when in said neutral position, closes off said second inlets when in said first drive position and is rotatable to a second drive position whereat said first inlets are closed off and said second inlets are in fluid communication with said chamber via said holes through said head for receiving gas under pressure and directing the same unto said turbine buckets to drive said roll shell in a reverse direction, and
- wherein said exterior portion of said valve stem is for manually rotating said valve between said neutral, forward and reverse drive positions.

8. The bearing roll shell assembly as defined in claim 7 wherein said exterior portion of said valve stem has a stop which engages said valve body to prevent positioning said valve in one of said forward and reverse drive positions.

9. The gas bearing roll shell assembly as defined in claim 7 wherein said stop is adjustable to select elimination of either said forward drive position or said reverse drive position.

10. The gas bearing roll shell assembly as defined in claim 7 wherein said turbine buckets have part circular cross sections generated from centers lying on radii of said second thrust ring.

* * * * *